United States Patent [19]

Kane

[11] Patent Number: 4,890,717
[45] Date of Patent: Jan. 2, 1990

[54] WHEEL TURNOVER DEVICE

[75] Inventor: John P. Kane, Sterling Heights, Mich.

[73] Assignee: Allied Automation Systems, Inc., Detroit, Mich.

[21] Appl. No.: 183,790

[22] Filed: Apr. 20, 1988

Related U.S. Application Data

[63] Continuation-in-part of Ser. No. 120,936, Nov. 16, 1987, Pat. No. 4,793,463.

[51] Int. Cl.$^4$ .............................................. B65G 47/24
[52] U.S. Cl. .................................... 198/403; 198/411; 414/759
[58] Field of Search ............... 198/402, 403, 411, 412, 198/413; 414/759, 774, 775

[56] References Cited

U.S. PATENT DOCUMENTS

| 591,712 | 10/1897 | Worth | 198/403 |
|---|---|---|---|
| 1,828,909 | 10/1931 | Peterson | 198/403 |
| 2,829,759 | 4/1958 | Parker | 198/403 |
| 3,552,538 | 1/1971 | Triggs et al. | 198/33 |
| 3,581,910 | 6/1971 | Field et al. | 214/1 QA |
| 3,780,882 | 12/1973 | Wagner | 214/1 QA |
| 4,533,291 | 8/1985 | Nishida | 414/728 |

FOREIGN PATENT DOCUMENTS

| 16414 | 10/1956 | Fed. Rep. of Germany | 198/403 |
|---|---|---|---|
| 522105 | 9/1976 | U.S.S.R. | 198/403 |
| 592690 | 2/1978 | U.S.S.R. | 198/403 |
| 1072942 | 2/1984 | U.S.S.R. | 414/759 |
| 1093658 | 5/1984 | U.S.S.R. | 198/403 |

Primary Examiner—Frank E. Werner
Assistant Examiner—D. Glenn Dayoan
Attorney, Agent, or Firm—Basile and Hanlon

[57] ABSTRACT

Turnover apparatus for the controlled turning of a flat-sided article, such as a vehicle wheel-tire unit, from a horizontal outside-up position to a horizontal outside-down position includes a chain conveyor for conveying the article in a horizontal position. A turnover device employs two pairs of elongate arms mounted for rotation about respective, spaced, parallel axes from and to a normal rest position wherein the pairs of arms project horizontally in opposite directions from their axes below and parallel to the conveying chains. One pair of arms is coupled to a reversible drive to be rotated upwardly from its rest position through an angle greater than 90° to tilt an article on the conveying chains upwardly to and past the vertical by an amount such that the article, if not restrained, would fall forwardly. Motion transmitting mechanisms couple the two pairs of arms to each other so that the other pair of arms engages the falling article to lower the article to the chains upon reversal of the drive. Various forms of motion transmitting mechanisms and a safety overload release are also disclosed.

A production line system utilizing the turnover device in a wheel balancing weight installation application is also disclosed.

12 Claims, 4 Drawing Sheets

WHEEL TURNOVER DEVICE

REFERENCE TO RELATED APPLICATIONS

This application is a continuation-in-part of my earlier filed Application Ser. No. 07/120,936 filed Nov. 16, 1987 now U.S. Pat. No. 4,793,463.

BACKGROUND OF THE INVENTION

The present invention is directed to article handling apparatus operable in a production line environment to turn articles, such as a vehicle wheel, from a horizontal position in which a first side of the article faces upwardly to an inverted position in which the article is again positioned horizontally, but with its opposite side facing upwardly.

The invention is disclosed as applied to the turning of a vehicle wheel assembly consisting of a wheel carrying a mounted and inflated tire in conjunction with the mounting of weights upon the wheel rim to rotatively balance the assembly.

In present-day tire-wheel assembly lines the wheel and tire units pass successively through a mounter where an uninflated tire is mounted upon its wheel, as inflation station at which the mounted tire is inflated, and a balancing station at which rotative imbalance of the assembled wheel and tire is determined and then to a work station where a worker applies lead weights to the wheel rim to correct the rotative imbalance determined by the balancer. The tire-wheel unit is conveyed through the mounter, inflator and balancing stations with the unit disposed in a horizontal position (wheel axis vertical) with what will be the outer side of the unit when assembled on a vehicle facing upwardly. Particularly for passenger vehicle wheels, for cosmetic reasons it is desired to mount the balancing weights, where possible, on the inner side of the wheel; and it is thus necessary to invert the wheel unit so that the worker applying the weights has access to the inner side of the wheel. After the balancing weights have been applied to the inner side of the wheel rim, it is then necessary to reinvert the wheel unit to its original outside-up position so that all wheels come off the end of the line in the same orientation.

The present invention is especially directed to a turnover device which will handle tire-wheel units of varying dimensions (as is requrid in nearly all present-day tire-wheel assembly production lines) while accommodating straight-through conveyance of the units through the turnover device.

Turnover devices in general are used in many industrial applications, typically to turn relatively large or bulky articles, such as steel plate or sheet metal parts. The present invention employs two pair of arms respectively mounted for pivotal movement about spaced, parallel, horizontal axes normal to the path of conveyance. Examples of prior art devices employing two sets of pivoted arms for turning over steel plate or sheet metal parts are found in U.S. Pat. No. 3,780,882; to Wagner U.S. Pat. No. 3,581,910; and U.S. Pat. No. 4,533,291. to Nishida. All three of these patents disclose turnover devices in which a flat article to be turned over is loaded upon a first pivoted arm assembly which provides the entire support for the article with the article in a horizontal position and then pivots about a horizontal axis to pivot the article upwardly to a generally vertical position. With the article in or close to a vertical position, the support of the article is transferred from the first arm unit to a second arm unit which then pivots about a horizontal axis to tilt the flat article back to a horizontal position. Because the arm units of these patents must not only provide the entire support of the article from the start to conclusion of the turnover operation and because the mechanisms employed must accomplish the transfer of support of the article from one arm unit to the other at some point in the turnover cycle, the mechanisms employed are quite complex and of a dedicated design matched to the dimensions, particularly the thickness, of the article being handled.

The turnover apparatus of the present invention must handle vehicle wheel units whose thickness can vary over a substantial range from the relatively smaller-sized standard wheel units to the low-profile, wide-tread units employed on high-performance vehicles. The present invention presents a turnover device which will accomplish the turning over of vehicle wheel units of a reasonably wide range of dimensions by relatively simple mechanisms.

SUMMARY OF THE INVENTION

In accordance with the present invention, tirewheel units to be turned over are supported upon and advanced by a pair of spaced, parallel conveying chains to a turnover station. At the turnover station, the tire-wheel unit, hereinafter referred to as the wheel, is located in overlying relationship to a first pair of turnover arms, which are called lifting arms, located at this time in a horizontal rest position slightly below the path of movement of the wheel. The lifting arms, when in their rest positions, extend parallel to the conveying chains and are symmetrically offset horizontally from the chains. A shaft extending horizontally below and normal to the chains mounts the arms for pivotal movement about a fixed horizontal axis, the arms when in their rest position extending generally radially from the shaft.

A second pair of turnover arms, which are called lowering arms, are similarly mounted upon a second shaft parallel to and spaced longitudinally of the conveyor from the first shaft. The first and second arms are coupled to each other by a motion-transmitting mechanism which locates the second arms in a horizontal rest position extending parallel to the conveyor from their second shaft away from the first shaft when the first set of arms is in their rest position.

With the wheel located in overlying relationship to the first set of arms (lifting arms), a drive mechanism is actuated to drive both sets of arms in coordinated pivotal movement from their rest positions upwardly about their respective axes. As the first set of arms swings upwardly, it will engage the overlying wheel and begin to lift and tilt the wheel upwardly upon the conveyor from its horizontal position to an upright position. The first arms continue to pivot about their axis to continue to tilt the wheel beyond a vertical, upright position. During this foregoing action of the first arms, the motion-transmitting mechanism coupling the first arms to the second arms pivots the second arms upwardly at a somewhat slower rate that the first arms so that the two sets of arms move into a spaced, parallel relationship to each other in which the arms are inclined from the vertical with the lifting (first set of) arms overlying the lowering (second set of) arms. The wheel at this time is of course located between the two sets of arms and the inclination of the wheel is such that it is unstable and now leans against the lowering arms. At this time, the drive is reversed and the first and second arms are returned to their respective rest positions, the lowering (second) arms lowering the wheel smoothly back onto the conveying chains.

Three forms of motion-transmitting mechanisms are disclosed, all of which couple the two sets of arms to each other for coordinated pivotal movement in opposite directions about their respective axes with the angular rate of movement of one set of arms being a predetermined multiple of the angular rate of movement of the other.

The drive mechanism employed preferably takes the form of a pneumatic (hydraulic) motor whose piston rod is coupled by a crank assembly to one of the two shafts. The crank assembly is constructed to provide a positive drive for the lifting cycle of the arms and is provided with an overload release mechanism operable during lowering movement of the arms to uncouple the drive means from its shaft if either arm encounters an abnormal resistance to movement during its lowering stroke. This is a safety feature designed to prevent injury to the machine operator.

A preferred application of the turnover device in a production line setting employs two turnover units in tandem with each other oriented to turn the wheel in opposite directions. The wheel enters the first unit outside up and weights are applied to the outer side of the wheel. The wheel is then advanced to the first turnover device which turns the wheel backwardly to an outside down position. Weights are then applied to the inner side of the wheel. The wheel is then advanced to the second turnover unit where it is turned forwardly to an outside up position.

Other objects and features of the invention will become apparent by reference to the following specification and to the drawings.

DESCRIPTION OF THE PREFERRED EMBODIMENTS

Figure 1:
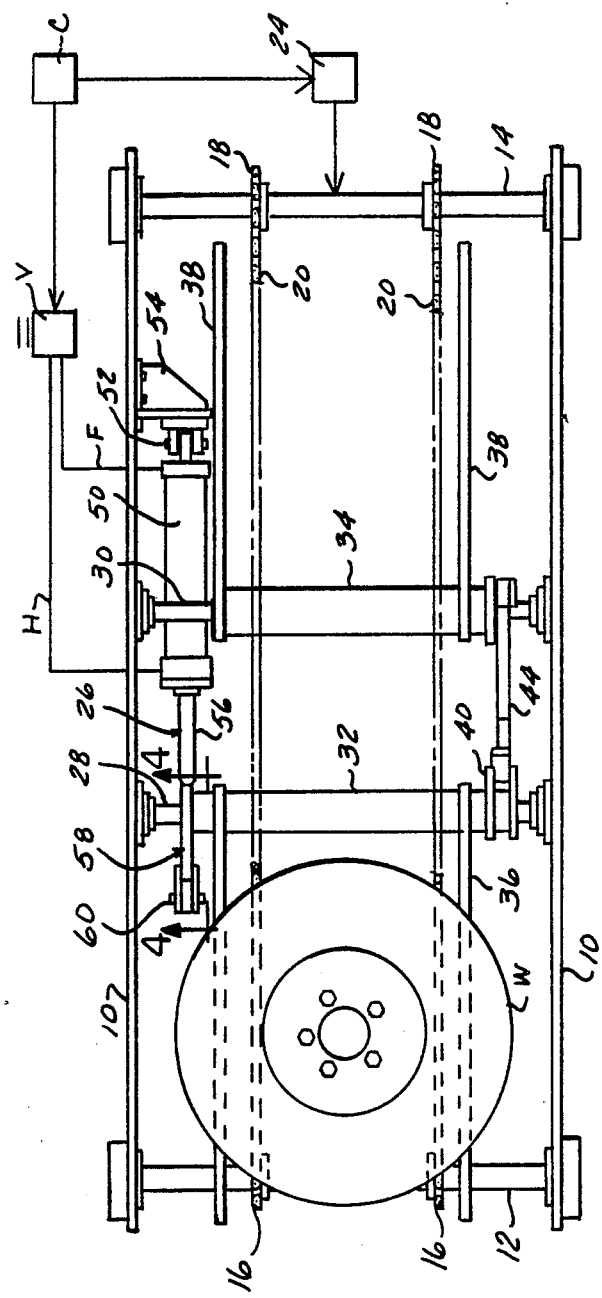
FIG. 1 is a top plan view of one embodiment of a wheel turnover apparatus embodying the present invention.
Figure 2:
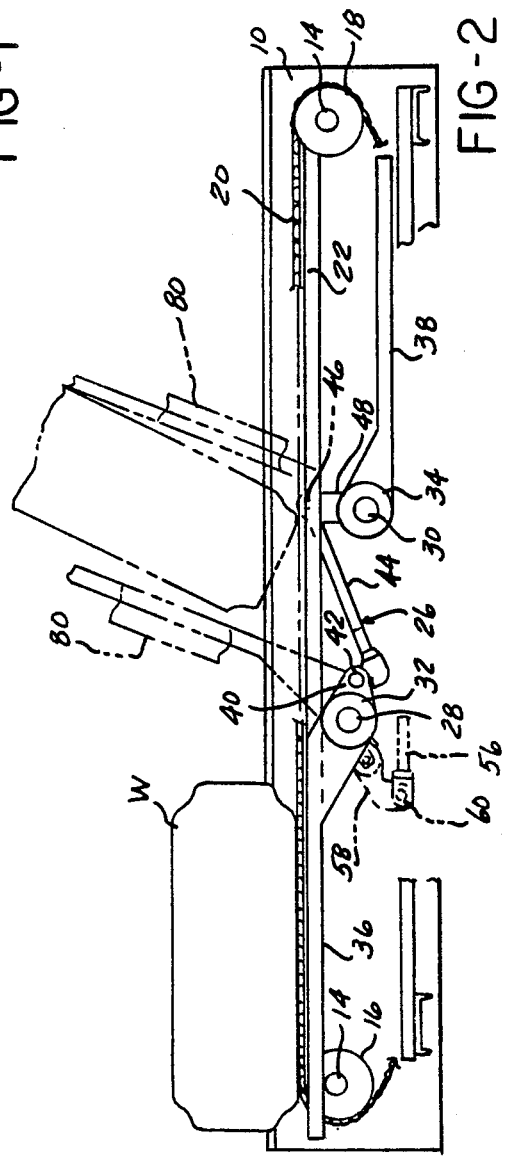
FIG. 2 is a side elevational view of the apparatus of FIG. 1, with certain parts broken away or omitted.

Referring now particularly to FIGS. 1 and 2, one embodiment of the invention includes a chain conveyor of relatively short length having a frame including a pair of parallel, longitudinally extending, fixed side rails 10. At the opposite ends of side rails 10, sprocket shafts 12 and 14 are rotatably supported within the rails, each of shafts 12 and 14 carrying a pair of spaced end sprockets 16, 18 which are rotatively locked to their respective shafts. A pair of endless roller chains 20 are operatively trained about sprockets 18 to extend in a horizontal, spaced, parallel relationship along a conveying run extending between sprockets 16 and 18. Horizontal support tails 22 (FIG. 2) are fixedly mounted in the machine frame to underlie the respective chains 20 in their extent along the horizontal upper run. One of sprocket shafts 12 and 14 is coupled to a suitable drive motor schematically illustrated at 24 in FIG. 1. In some applications, motor 24 may be reversible—that is, operable to drive chains 20 in either direction; however, for present purposes it is assumed motor 24 normally operates to drive chains 20 so that the upper conveying runs of the chains move from left to right as viewed in FIGS. 1 and 2.

As best seen in FIG. 1, the spacing of chains 20 relative to each other is such that the chains are operable to support, upon their upper run, a vehicle wheel unit W consisting of a wheel with a mounted and inflated tire. The wheel W is supported upon the chains in a horizontal position and is centered transversely of the conveyor; that is, the wheel axis is vertically aligned with the longitudinal centerline of the conveyor.

A turnover apparatus designated generally 26 is mounted between side rails 10 approximately midway of the length of the conveyor for the purpose of turning a wheel unit W over upon a conveyor so that that side of the wheel unit W which originally faced upwardly will be facing downwardly upon the conclusion of the turnover operation. Turnover apparatus 26 includes a pair of rigid shafts 28, 30 whose opposite ends are fixedly mounted in the respective side rails 10. A hollow sleeve 32 is rotatively received upon shaft 28 for free rotation relative to shaft 28 and a sleeve 34 is similarly received on the shaft 30.

A pair of rigid lifting arms 36 are fixedly secured at one end to sleeve 32 in a spaced, parallel relationship best seen in FIG. 1 wherein the arms 36 extend parallel to each other at locations symmetrically spaced outwardly from the respective conveying chains 20.

A pair of lowering arms 38 are similarly fixedly secured to sleeve 34 at one end and extend from sleeve 34 in parallel relationship to each other at locations spaced outwardly from the chains 20.

Referring now particularly to FIG. 2, a crank arm 40 is fixedly secured to sleeve 32 at one end of the sleeve and is coupled at its distal end by a pivot pin 42 to one end of a rigid link 44. The opposite end of link 44 is coupled by a pivot pin 46 to the distal end of a crank 48 which is fixedly secured to sleeve 34. Crank arms 40 and 48, together with link 44 and the pivotal interconnections between the link and crank arms constitutes a motion-transmission mechanism by means of which rotary movement of one of the two sleeves is transmitted to and requires a related rotation of the other sleeve upon its shaft.

In FIG. 2, the arms 36 and 38 are located in what will be referred to as their normal rest position in which the two sets of arms extend generally horizontally in opposite directions from their respective sleeves, both sets of arms 36 and 38 when in their respective horizontal rest positions being disposed below the path of movement of wheel units W along the conveyor.

Referring now particularly to FIG. 1, the cylinder 50 of a double-acting pneumatic motor is mounted by a pivot pin 52 upon a bracket 54 fixedly secured to one of the side rails 10. The piston rod 56 of the motor passes beneath shaft 28 and is coupled to a crank arm assembly designated generally 58 as by a pivot 60.

Figure 3:
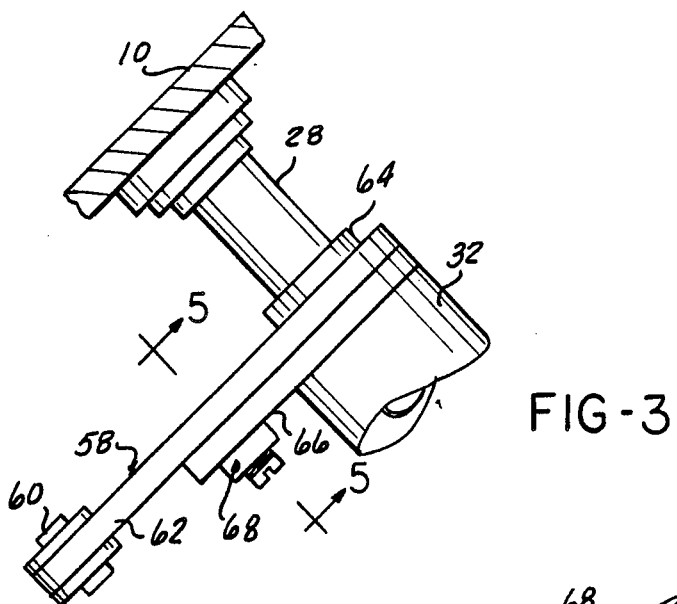
FIG. 3 is a detail top plan view, with certain parts broken away or shown in section, of an overload release device incorporated in the apparatus.
Figure 5:
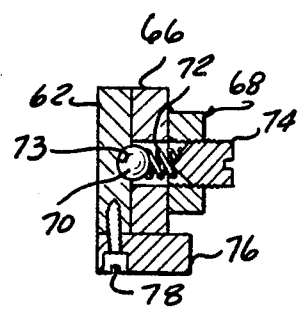
FIG. 5 is a detail cross-sectional view taken on the line 5—5 of FIG. 3.
Figure 4:
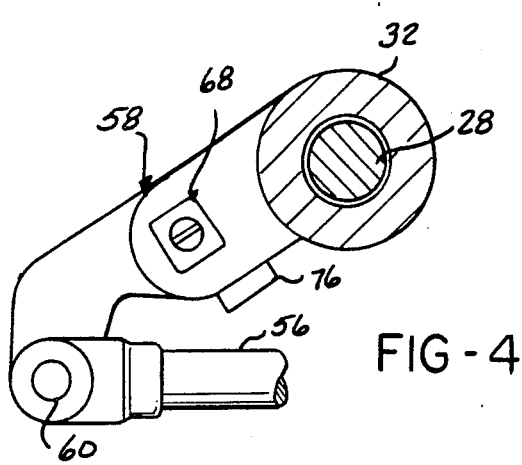
FIG. 4 is a cross-sectional view taken on the line 4—4 of FIG. 1.

Details of crank assembly 58 are best seen in Figs. 3 through 5. Referring first to FIG. 3, crank arm assembly 58 includes a first link 62 coupled at one end by pivot 60 to piston rod 56 and rotatably mounted at its opposite end for free rotation about shaft 28. As viewed in FIG. 3, the lower or right-hand surface of link 62 as viewed in this figure is in face-to-face abutment with the end of sleeve 32, but there is no direct connection between link 62 and sleeve 32.

A crank arm 66 is fixedly secured, as by welding, to sleeve 32 to project from the sleeve in close side-by-side relationship with link 60. At the distal end of crank 66 a detent assembly 68 which, as best seen in FIG. 5, includes a detent ball 70 carried on arm 66 which is pressed by a spring 72 into a hemispherical recess 73 in link 62. Detent assembly 68 thus releasably couples arm 66 and link 62 to each other for concurrent rotation about the axis of shaft 28. Detent assembly 68 functions as an overload release mechanism for a purpose to be described below. The amount of overload necessary to unseat ball 70 from recess 73 may be adjustably selected by appropriate adjustment of set screw 74 which will adjust the compressive force applied by spring 72.

A positive coupling between link 62 and crank 66 for movement in one direction of rotation is provided by an abutment block 76 fixedly mounted as by a bolt 78 upon link 62 to project into underlying relationship with one side edge of link 66.

Returning now to FIG. 2, the coupling between piston rod 56 and sleeve 32 via crank arm assembly 58 is so oriented that when piston rod 56 is at its fully retracted, or extreme rightward end limit of movement relative to cylinder 50 as viewed in FIGS. 1 and 2, arms 36 and 38 are located in their normal rest position shown in full line in FIG. 2. Upon extension of piston rod 56 from the cylinder to the fully extended position indicated in broken line in fig. 2, arms 36 and 38 will be respectively pivoted relative to shafts 28 and 30 to the positions illustrated in broken line in FIG. 2. Subsequent retraction of piston rod 56 will restore the arms 36 and 38 to the full line position shown in FIG. 2.

OPERATION OF THE EMBODIMENT OF FIGS. 1 THROUGH 5

The wheel unit W is loaded, either automatically or manually, upon the left-hand end of the conveying chains as viewed in FIGS. 1 and 2 of the drawings. The wheel unit W rests in a horizontal position upon chains 20 and conventionally is placed upon the chains with its outer side facing upwardly.

Flow of air under pressure from a source P to and from cylinder 50 via rod end and head end conduits R and H is controlled by conventional reversing valve V, and the operation of drive motor 24 is under the control of a controller C (FIG. 1). Such controllers are well known and commercially available from several sources and hence are not described in detail.

With arms 36 and 38 in the normal rest position shown in full line in FIG. 2, conveyor chains 20 are driven to move the wheel unit W to the right as viewed in FIG. 2 until the leading end of the wheel unit is above or somewhat to the right of shaft 28 as viewed in FIG. 2. In one type of operation, the conveyor will be stopped at this time, either automatically as by the use of an electric eye unit (not shown) or manually by the worker. Cylinder 50 is then actuated by the control system to extend its piston rod 56 from the fully retracted position to cause the rod to stroke to the left as viewed in FIGS. 1 and 2. During this stroke, the coupling between piston rod 56 and sleeve 32 constituted by crank assembly 58 will cause sleeve 32 to rotate in a clockwise position as viewed in FIG. 2 to thus drive lifting arms 36 upwardly in a clockwise direction about the axis of shaft 28 from the 9:00 o'clock position shown in FIG. 2 upwardly to and past a vertical 12:00 o'clock relationship to shaft 28 to an approximate 1:00 o'clock relationship indicated in broken line in FIG. 2. As lifting arms 36 move through this arc, the wheel unit W is tilted upwardly from its horizontal position upon chains 20 to and beyond a vertical position on the chains. The total rotative stroke of lifting arms 36 is such that the wheel is tilted beyond a stable position to the orientation indicated in broken line in FIG. 2 and would fall freely downwardly onto conveying chains 20 were it not for the fact that at this time the lowering arms 38 have assumed the position shown in broken line in FIG. 2 to engage and support the wheel unit as indicated.

As lifting arms 36 move in a clockwise direction away from their rest position as shown in FIG. 2, the clockwise rotation of sleeve 32 which generates this movement is transmitted, via link 44, to sleeve 34 to cause sleeve 34, and hence lowering arms 38, to rotate in a counterclockwise direction about shaft 30. The geometry of the linkage constituted by crank 40, link 44 and crank 46 is such that a given rotative displacement of sleeve 32 and lifting arms 36 results in a somewhat smaller rotative displacement of sleeve 34 and lowering arms 38 so that, for a full stroke of piston rod 26, lifting arms 36 are moved through an angle greater than 90° while lowering arms 38 are driven through an angle smaller than 90°.

At this point, it should be noted that nearly all present-day wheel unit production lines are set up to process tire-wheel units of several different sizes which pass through the tire-wheel line in an order predetermined by the requirements of the vehicle assembly line. In many instances, this mix of tire and wheel sizes may vary from small standard wheel units to relatively large, wide-tread, low-profile wheel units intended for usage on high-performance vehicles. In determining the angle at which arms 36 are located at the completion of their rotative stroke (broken line position of FIG. 2), it is necessary to consider which of the various sizes of tires to be handled requires the maximum amount of tilt from a true vertical position to reach an unstable position. Normally this will be the wheel unit with the maximum tread width. The spacing between shafts 28 and 30 and the configuration of the arms must also take the maximum wheel dimensions into consideration.

Once the wheel unit has been tilted by lifting arms 36 into an unstable position as shown in broken line in FIG. 2, the wheel unit will continue to tilt until it engages lowering arms 38. Cylinder 50 is then actuated to retract piston rod 56 to return arms 36 and 38 to their original rest positions. During this return movement, the tire rests upon lowering arms 38 and is lowered by arms 38 gently onto chains 20 with the inner side of the wheel unit now facing upwardly.

The detent abutment arrangement of crank arm assembly 58 functions as a safety overload release device during the return movement of arms 36 and 38 to their original rest position. During their return movement to the rest position, arms 36 and 38 swing downwardly past conveyor chains 20 with a scissor-like action. In the event a worker's hand or arm were caught between the descending arm and stationary chain during lowering movement of arms 36 and 38, serious injury could result. In this event, however, the increased resistance to movement of arms 36, 38 will overcome the release setting of detent 70, 72 (FIG. 5) to disconnect the drive link 62 from crank arm 66 to thereby disconnect the driving force from arms 36 and 38. Preferably, the undersides of all arms are provided with cushioning elements partially indicated at 80 in FIG. 2.

EMBODIMENT OF FIGS. 6 AND 7

Figure 6:
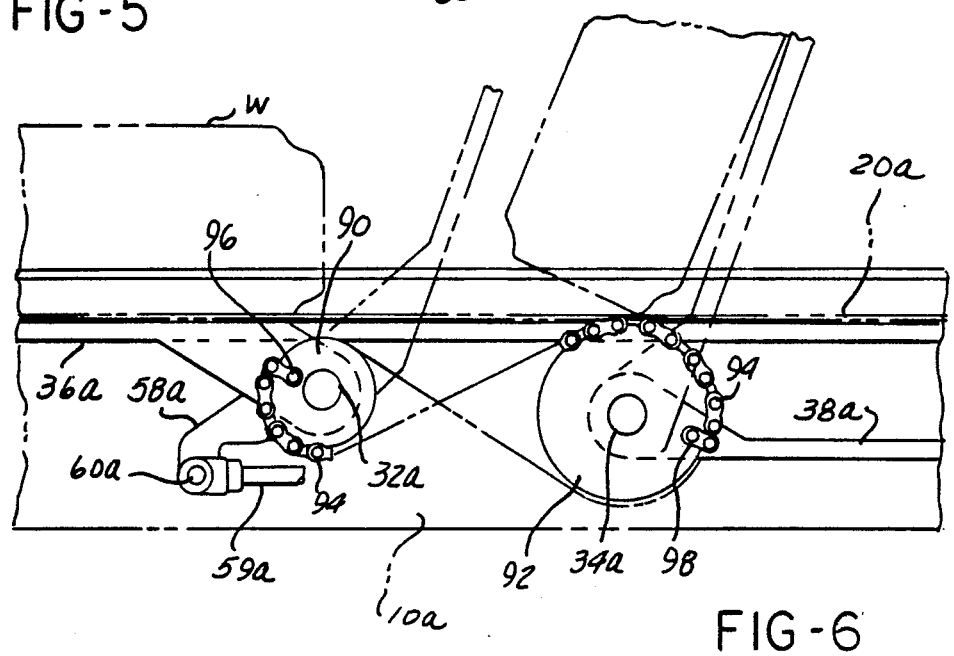
FIG. 6 is a side elevatonal view of a portion of a turnover apparatus incorporating a modified form of motion-transmitting apparatus.
Figure 7:
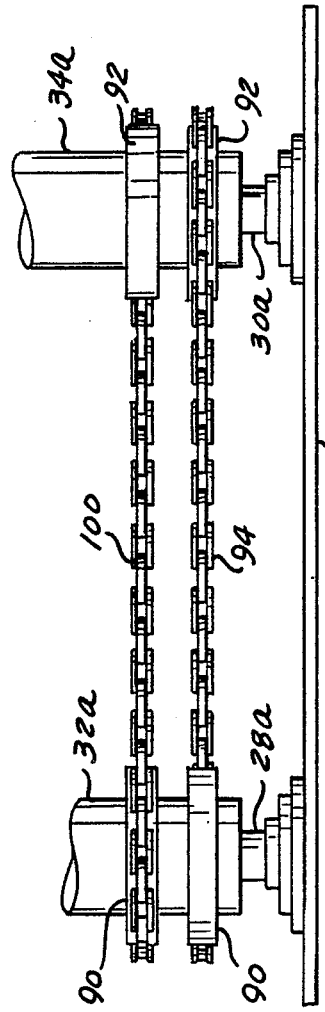
FIG. 7 is a top plan view showing further details of the motion-transmitting apparatus of FIG. 6.

The embodiment of FIGS. 6 and 7 differs from the embodiment of FIGS. 1 through 5 solely in the employment of a different form of mechanism for transferring motion between the two sets of tire turnover arms. In FIGS. 6 and 7, those parts illustrated corresponding to parts described above in connection with the description of the embodiment of FIGS. 1 through 5 are identified with the same reference numerals followed by the subscript "a".

In the embodiment of FIGS. 6 and 7, the mechanism for transmitting rotary movement of sleeve 32a to sleeve 34a takes the form of a pair of sprockets 90 fixedly mounted upon sleeve 32a and a pair of sprockets 92 fixedly mounted on sleeve 34a. A first chain 94 is fixedly mounted at one end upon the outermost sprocket 90 as at 96 and extends from this fixed coupling point in a counterclockwise direction partially about the circumference of sprocket 90 and then passes to the aligned outer sprocket 92 on shaft 34a. As best seen in FIG. 6, the chain 94 is wrapped in a clockwise direction about the periphery of sprocket 92 and terminates at an end fixedly mounted to the sprocket 92 as at 98. A second chain 100 is secured at one end to the inner sprocket 90 on sleeve 32a in a similar fashion but extends from this mounting point in the opposite or clockwise direction about its sprocket 90, is partially wrapped around the aligned inner sprocket 92 on shaft 34 and has its end secured to this latter sprocket 92. When viewed from the side as in FIG. 6, the two chains, 94 and 100 collectively present a figure-eight configuration; however, each chain extends only along half of a figure-eight shaped line. When sleeve 32a is driven in clockwise rotation to elevate the arms from their rest position, the chain 94 is placed in tension to transmit this rotation to the coupled outer sprocket 94 on sleeve 34a. When sleeve 32a is driven in a counterclockwise direction to return the arms to their original rest position, chain 100 is placed in tension to transmit this rotation to sleeve 34a.

EMBODIMENT OF FIG. 8

Figure 8:
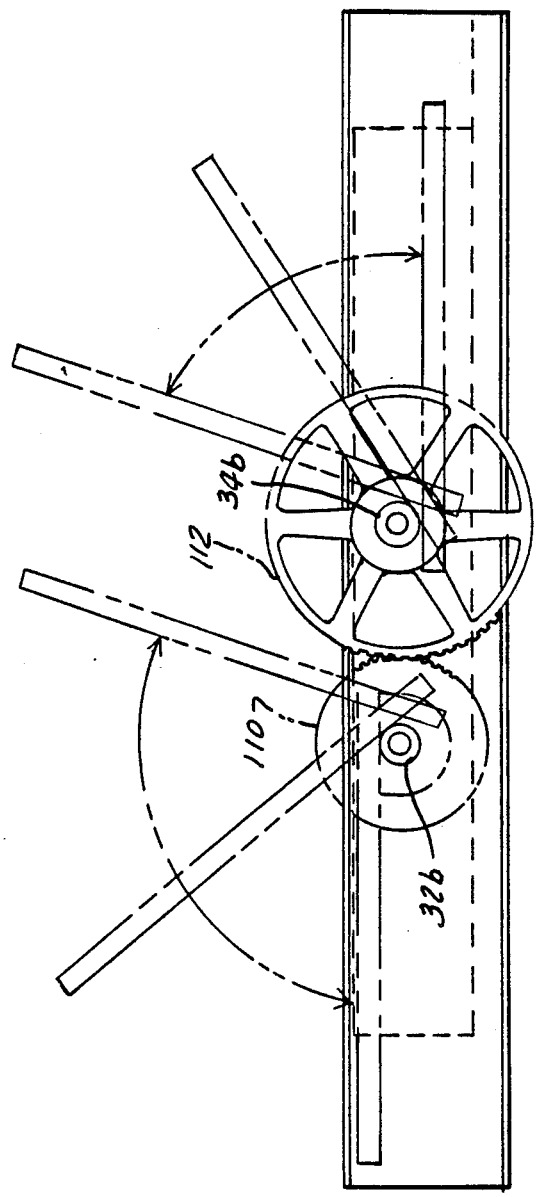
FIG. 8 is a side elevational view of a tire turnover apparatus employing another form of motion-transmitting apparatus.

The embodiment of FIG. 8 likewise differs from the embodiment of FIGS. 1 through 5 solly in the mechanism employed to transmit motion from one sleeve to the other.

In the embodiment of FIG. 8, the coupling between sleeve 32b, which is driven by the piston rod, and sleeve 34b takes the form of a gear 110 fixedly mounted on sleeve 32b and a second gear 112 fixedly mounted on sleeve 34b in mesh with gear 110. This arrangement replaces the linkage connection constituted by crank 40, link 44 and crank 48 of the FIGS. 1 through 5 embodiment. Otherwise, the construction of the embodiment of FIG. 8 is identical to that of the embodiment of FIGS. 1 through 5.

USAGE IN PRODUCTION LINE BALANCING WEIGHT INSTALLATION

In FIGS. 9A through 9J, a production line installation utilizing the turnover devices described above and an operational procedure utilizing the turnover devices in a wheel balancing weight installation is schematically illustrated.

The installation includes an in-feed conveyor, partially illustrated at 200 which receives wheel units from the balancing station, not shown, a first turnover unit, which may take the form of any of the three embodiments described above, designated generally 201, a second similar turnover unit designated generally 202 and a take-out conveyor partially illustrated at 204. The figures indicate only the conveying chains 20-1, lifting arms 36-1 and lowering arms 38-1 of turnover unit 201 and the conveying chains 20-2, lifting arms 36-2 and lowering arms 38-2 of turnover unit 202. These specific components of units 201 and 202 correspond respectively to the chains 20, lifting arms 36 and lowering arms 38 of the embodiments described in detail above. For purposes of explanation, it will be assumed that units 201 and 202 take the form of the embodiment of FIGS. 1 through 5.

In-feed conveyor 200, the chains 20-1 and 20-2 of units 201 and 202 and conveyor 204, when driven, are all driven in a direction such that wheel units, such as wheel unit W1, are conveyed from left to right as viewed in Figs. 9A through 9J. It will be noted that turnover units 201 and 202 are installed with a reverse orientation with respect to each other—the lifting arms 36-1 of unit 201 are located adjacent the downstream end of unit 201, while the lifting arms 36-2 of unit 202 are located adjacent the upstream end of unit 202.

Operation of the various units 200, 201, 202 and 204 will be under the control of a control system which operates in response to the position of various wheel units on the various conveyors and the positioning of the lifting and lowering arms within their cycle of movement. Control systems having such capabilities are well known in the art and hence are not described in detail. Preferalby, such a control system would include a manual override under the control of the operator who installs the balancing weights upon the wheel units. The installation of the weights on the wheel unit requires a manual installation of weights of a size selected from a range of sizes to specific locations on the individual wheels, and the time required for the installation of one set of weights will typically differ from the time required for the installation of the next set of weights due to differences in numbers and locations of the weights to be installed. The wheel unit must be stationary during the installation.

In FIGS. 9A through 9J, the various wheel units W1, W2, etc. have been illustrated with a black stripe along one side of the wheel unit to identify the outer side of the wheel unit. As stated above, movement of the wheel units through the production line is with an outside up orientation.

Figure 9A:
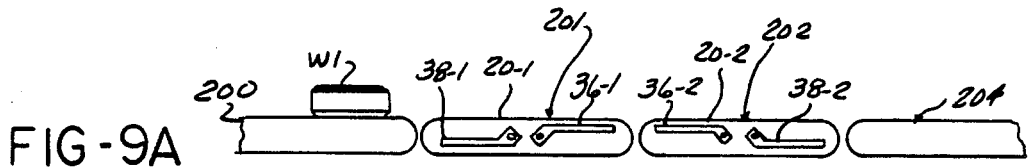
FIGS. 9A through 9J are schematic side elevations of wheel turnover devices of the present invention showing successive steps of operation in a production line setting.

In FIG. 9A, the system is illustrated at the commencement of a production run. A first wheel unit W1 is located in a ready position, outside up, at the downstream end of in-feed conveyor 200, ready to be fed into the first turnover unit 201. At this point, the system is started up and wheel W1 is advanced to the right as viewed in FIG. 9A onto chains 20-1 of turnover unit 201 and advanced by chains 20-1 to the position shown in FIG. 9B, at which time chains 20-1 are stopped. Simultaneously, in-feed conveyor 200 advances a second wheel W2 toward the rady position. With wheel W1 stationary at the position shown in FIG. 9B, the worker manually installs balancing weights as required upon the outer rim of wheel W1.

Figure 9B:
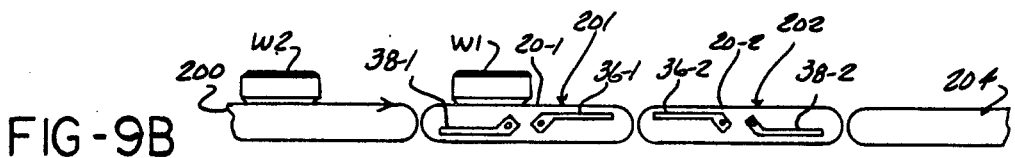

After the weights have been installed on the outer rim of wheel W1, conveying chains 20-1 of the first unit are actuated to drive wheel W1 to the right from its FIG. 9B position, and simultaneously the arms 36-1, 38-1 are actuated to swing upwardly from their rest positions as described above. As indicated in FIG. 9C, wheel unit W1 is driven by the moving chains 20-1 to slide upwardly along the upwardly pivoting lifting arm 36-1.

Figure 9C:
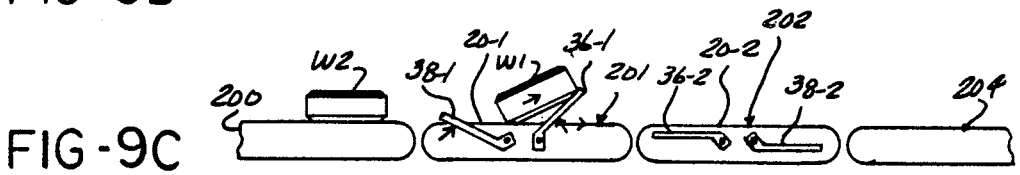
Figure 9D:
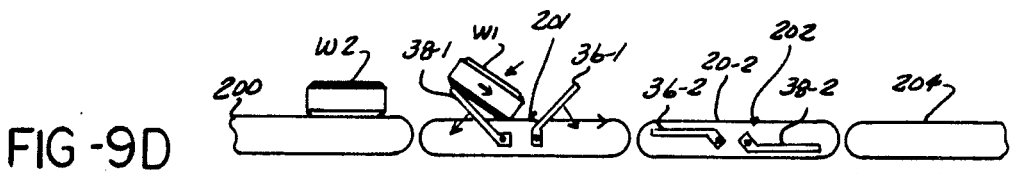

As described above in connection with the operation of the FIGS. 1 through 5 mbodiment, the wheel is tilted upwardly to and beyond a vertical position until it falls onto the elevated lowering arms 38-1, at which time the pivotal movement of the arms is reversed to enable the lowering arms 38-1 to lower the tire back downwardly toward chains 20-1 as indicated in FIG. 9D.

The objective of driving chains 20-1 while the turnover operation of FIGS. 9C and 9D is occurring is twofold. First, the turnover of the wheel is commenced before the wheel being turned is advanced into fully overlying relationship with lifting arms 36-1 with a consequent saving in cycle time. Second, by driving chains 20-1 for a regulated time, the wheel being turned can be positioned in an outside down orientaton at the same position longitudinally of the conveyor which the wheel occupied prior to the commencement of the turnover cycle. Thus, at the conclusion of the turnover cycle, the wheel is directly in front of the worker—that is, at the location shown in FIG. 9E—who then proceeds to install the required weights on the inner side of the wheel rim of wheel W1.

Figure 9E:
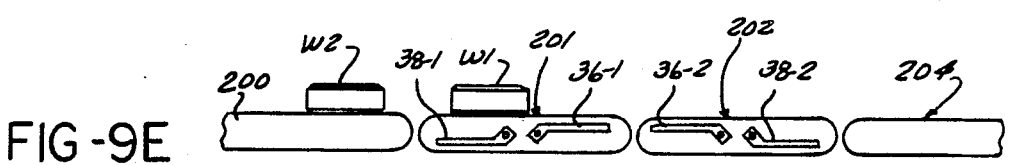
Figure 9F:
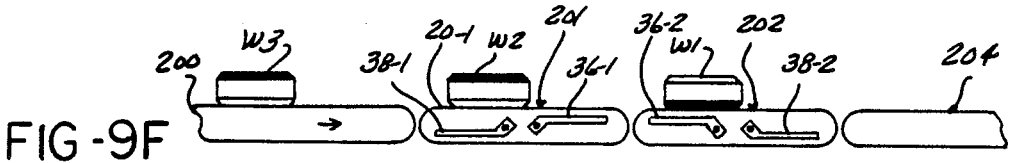

The next step in the operation finds in-feed conveyor 200 and chains 20-1 and 20-2 being driven to advance wheels W1 and W2 from the positions shown in FIG. 9E to those shown in FIG. 9F, while a third wheel W3 is advanced along conveyor 200 toward the ready position. When wheel W2 reaches the position on turnover unit 201 shown in FIG. 9F, chains 20-1 are stopped, and the worker installs the balancing weights on the outer side of the wheel rim of wheel W2.

At this time, wheel W1 is positioned in an outside down position on the second turnover unit 202, and this unit may be actuated to stop chains 20-2 when wheel W1 is positioned in overlying relationship with lifting arms 36-2 of unit 202. Actuation of arms 36-2, 38-2 to turn wheel W1 over, as shown in FIGS. 9G, 9H and 9I, may be commenced anytime after wheel W1 arrives at the locatoin shown in Fig. 9F.

Figure 9G:
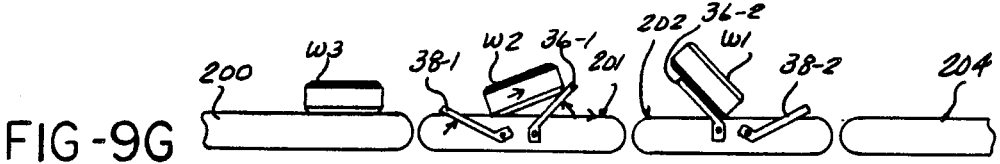
Figure 9H:
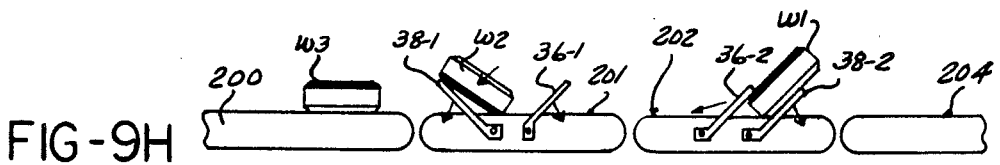

Returning to FIG. 9F, after the balancing weights have been installed on the outer side of the rim of wheel W2, wheel W2 is subjected to a turnover cycle on unit 201 as was described above in connection with wheel W1—compare the manipulation of wheel W1 in FIGS. 9C, D and F with the manipulation of wheel W2 in FIGS. 9G, H and I. At the conclusion of this turnove operation, wheel W2 is in an outside down position at the upstream end of chains 20-1 for installation of balancing weights to its inner wheel rim. At this time, as shown in FIG. 9I, wheel W1 has been turned over on turnover unit 202 and is now located at the downstream end of that unit in its original outside up orientation.

Figure 9I:
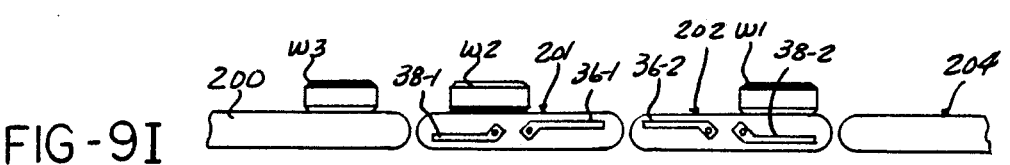
Figure 9J:
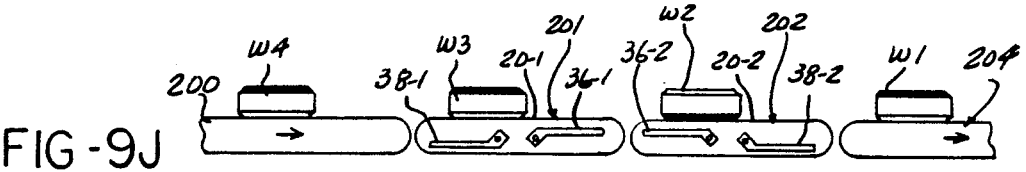

The next step in the operation is to energize all of the various conveyors to advance wheels W1, W2 and W3 from the positions shown in FIG. 9I to those shown in FIG. 9J. A following wheel W4 is simultaneously advanced along intake conveyor 200.

In FIG. 9J, the first wheel W1, with all weights installed, is now located in an outside up position on takeout conveyor 204 which normally will be operated continuously to convey wheels to the next station as soon as they are discharged from turnover device 202.

The second wheel W2 is now located in an outside down position upon the second turnover unit 202, ready to be turned over to restore it to an outside up position, while the third wheel W3 is positioned in an outside up position at the upstream end of turnover unit 201, ready for installation of weights to its outer wheel rim.

In most cases, present-day tire-wheel assembly lines handle two or three different standard road tire sizes with mini-spare tire-wheel units interspersed, one mini-space for each four standard units. While the mini-spare tires are mounted and inflated on the line, they are not balanced and turnover units 201 and 202 will be provided with either a mini-spare sensing device or an operator-actuated bypass signal which will pass the mini-spares directly through turnover units 201 and 202 without turning the mini-spaces over.

Similarly, in some instances it may not be necessary to install any weights on the outside of the wheel rim, and turnover unit 201 is preferably provided with an operator-actuated control which will feed the incoming wheel unit directly from the in-feed conveyor 200 into the turnover device of turnover unit 201 without stopping for the unneeded installation of weights on the outer rim of the wheel as in FIGS. 9B, 9F and 9J. While substantially all wheel units will require balancing weights, the amount of weight required may be so small in some instances that a single relatively small weight is all that is required and this weight will be installed on the inner rim for cosmetic purposes.

While various embodiments of the invention have been shown and described in detail, it will be apparent to those skilled in the art the disclosed embodiments may be modified. Therefore, the foregoing description is to be considered exemplary rather than limiting, and the true scope of the invention is that defined in the following claims.

What is claimed is:

1. Article handling apparatus comprising conveying means for conveying tire wheel assemblies along a generally horizontal path with a first side surface of said assemblies uppermost during transit of a first portion of said path, a turnover device located at the downstream end of said first portion of said path for engaging a tire-wheel assembly and turning the assembly over upon said conveying means to position the article on said conveying means with said first side surface lowermost, said tire-wheel assemblies projecting outwardly from opposite sides of said conveying means;

said turnover device comprising first and second arm means each mounted for pivotal movement about respective first and second generally horizontal axes extending normal to said path and spaced from each other by a distance at least equal to the distance between said opposed side surface of said tire-wheel assembly, each of said arm means comprising a shaft mounted for rotation about one of said axes and a pair of elongate parallel arms fixedly mounted at opposite ends of said shaft at locations spaced outwardly from the opposite sides of said conveying means, said arms being normally disposed in respective rest positions below the path of movement of articles along said first path wherein the arms of said first arm means extend generally horizontally upstream from said first axis and the arms of said second arm means extend generally horizontally downstream from said second axis, drive means coupled to the shaft of said first arm means operable to drive said first arm means in pivotal transfer movement about said first axis from its rest position to a transfer position wherein the arms of said first arm means are inclined from said first axis upwardly above and downstream of said conveying means and to drive said first arm means in return movement to return said first arm means from its transfer position to its rest position, and motion transmission means coupling the shaft of said first arm means to the shaft of said second arm means to drive said second arm means in transfer movement coordinated with the transfer movement of said first arm means from its rest position to a transfer position wherein the arms of said second arm means are in spaced, parallel opposed relationship to said arms of said first arm means in response to transfer movement of said one of said arm means and to drive said second arm means in return movement to return said second arm means from its transfer position to its rest position in response to return movement of said first arm means to its rest position; and overload release means operable to uncouple said one of said arm means from said drive means during the return movement of said arm means toward their respective rest positions in response to an abnormal resistance to said return movement encountered by either of said arm means.

2. The invention defined in claim 1 wherein coupling means coupling said drive means to the shaft of one of said arm means, said motion transmission means coupling the last-mentioned shaft to the shaft of the other of said arm means.

3. The invention defined in claim 2 wherein said coupling means comprises abutment means positively coupling said drive means to the shaft of said one of said arm means to positively drive said one of said arm means in transfer movement.

4. The invention defined in claim 2 wherein said motion transmission means comprises gear means intermeshed between and positively rotatively coupling the shafts of both arm means to each other to cause one shaft to rotate in the direction opposite to the direction of rotation of the other shaft.

5. The invention defined in claim 2 wherein said motion transmission means comprises sprocket means fixedly mounted on each of said shafts, and chains means interlinked with said sprocket means to cause one shaft to rotate in the direction opposite to the direction of rotation of the other shaft.

6. Article handling apparatus comprising conveying means for conveying articles having generally parallel, opposed side surfaces along a generally horizontal path with a first side surface of said articles uppermost during transit of a first portion of said path, a turnover device located at the downstream end of said first portion of said path for engaging an article and turning the article over to position the article on said conveying means with said first side surface lowermost;

said turnover device comprising first and second arm means mounted for pivotal movement about respective first and second generally horizontal axes extending normal to said path and spaced from each other by a distance at least equal to the distance between said opposed side surfaces of an article, said arm means being normally disposed in respective rest positions below the path of movement of articles along said first path wherein said first arm means extends generally horizontally upstream from said first axis and said second arm means extends generally horizontally downstream from said second axis, drive means coupled to one of said arm means operable to drive said one of said arm means in transfer movement from its rest position to a transfer position wherein said one of said arm means is inclined from its axis upwardly and downstream of said conveying means and to drive said one of said arm means in return movement to return said one of said arm means from its transfer position to its rest position, and motion transmission means coupling said one of said arm means to the other of said arm means to drive said other of said arm means in transfer movement coordinated with the transfer movement of said one of said arm means from its rest position to a transfer position wherein said other of said arm means is in spaced, parallel relationship to said one of said arm means in response to transfer movement of said one of said arm means and to drive said other of said arm means in return movement to return said other of said arm means from its transfer position to its rest position in response to return movement of said one of said arm means;

wherein each of said first and second arm means comprises a shaft mounted for rotation about the respective first and second axes, a pair of elongate arms fixedly mounted on and extending generally radially from each shaft in parallel, spaced relationship to said path respectively adjacent the opposite sides of said conveying means, coupling means coupling said drive means to the shaft of one of said arm means, said motion transmission means coupling the last-mentioned shaft to the shaft of the other of said arm means;

wherein said drive means comprises a fluid pressure operated motor including a reciprocable piston rod, a first crank arm mounted at one end for rotation about the axis of the shaft of said one of said arm means and pivotally coupled at its other end to said piston rod, a second crank arm fixedly mounted at one end to the last-mentioned shaft and projecting radially from the last-mentioned shaft alongside said first crank arm, abutment means engageable between said crank arms for positively transmitting rotation of said first crank arm to said second crank arm when said first crank arm is rotated about the last-mentioned shaft axis in a direction driving said arm means away from their respective rest positions, and releasable detent means.

7. Article handling apparatus comprising conveying means for conveying articles having generally parallel, opposed side surfaces along a generally horizontal path with a first side surface of said articles uppermost during transit of a first portion of said path, a turnover device located at the downstream end of said first portion of said path for engaging an article and turning the article over to position the article on said conveying means with said first side surface lowermost;

said turnover device comprising first and second arm means mounted for pivotal movement about respective first and second generally horizontal axes extending normal to said path and spaced from each other by a distance at least equal to the distance between said opposed side surfaces of an article, said arm means being normally disposed in respective rest positions below the path of movement of articles along said first path wherein said first arm means extends generally horizontally upstream from said first axis and said second arm means extends generally horizontally downstream from said second axis, drive means coupled to one of said arm means operable to drive said one of said arm means in transfer movement from its rest position to a transfer position wherein said one of said arm means is inclined from its axis upwardly and downstream of said conveying means and to drive said one of said arm means in return movement to return said one of said arm means from its transfer position to its rest position, and motion transmission means coupling said one of said arm means to the other of said arm means to drive said other of said arm means in transfer movement coordinated with the transfer movement of said one of said arm means from its rest position to a transfer position wherein said other of said arm means is in spaced, parallel relationship to said one of said arm means in response to transfer movement of said one of said arm means and to drive said other of said arm means in return movement to return said other of said arm means from its transfer position to its rest position in response to return movement of said one of said arm means;

wherein each of said first and second arm means comprises a shaft mounted for rotation about the respective first and second axes, a pair of elongate arms fixedly mounted on and extending generally radially from each shaft in parallel, spaced relationship to said path respectively adjacent the opposite sides of said conveying means, coupling means coupling said drive means to the shaft of one of said arm means, said motion transmission means coupling the last mentioned shaft to the shaft of the other of said arm means; and wherein said motion transmission means comprises a crank rotatively fixed to and extending radially from each of said shafts, and link means interconnecting the distal ends of the cranks to each other to cause one shaft to rotate in a direction opposite to the direction of rotation of the other shaft.

8. Turnover apparatus for turning a vehicle wheel from a horizontal outside-up position to a horizontal outside-down position, said apparatus comprising conveying means including a pair of conveying chains extending in horizontal, spaced, parallel relationship along a conveying run and operable to convey a vehicle wheel along said run from an inlet end of said run to an outle end, said chains being spaced from each other by a distance less than the outer diamete of said wheel and adapted to support and convey a wheel in a horizontal position with the axis of the wheel midway between said chains, first and second pivot means located at spaced positions along said run intermediate and inlet and outlet ends defining respective first and second horizontal, fixed pivot axes extending normal to the path of movement of a wheel along said run, said first axis being spaced from said inlet end by a distance at least equal to the outer diameter of said second axis being spaced from said outlet end by a distance at least equal to the outer diameter of said wheel and said first axis being located between said inlet end and said second axis, first arm means mounted for pivotal movement about said first axis between a normally maintained rest position wherein said first arm means extends radially from said first axis toward said inlet end in a substantially horizontal position below the path of movement of a wheel along said run and a transfer position wherein said first arm means projects above said path in a position inclined upwardly from said fist axis toward said outlet end, second arm means mounted for pivotal movement about said second axis between a normally maintained rest position wherein said second arm means extends from said second axis toward said outlet end in a substantially horizontal position below said path and a transfer position wherein said second arm means projects above said path in an inclined position in opposed, spaced, parallel relationship to the transfer position of said first arm means, drive means for driving one of said arm means in a turnover cycle wherein said one of said arm means is driven from its rest position to its transfer position and then returned to its rest position, and motion transmitting means coupling said first and second arm means to each other to constrain both of said arm means to move simultaneously from their respective rest positions to their respective transfer positions and to return to their respective rest positions, said first arm means being operable upon movement from its rest position to its transfer position to engage a wheel located on said chains in a horizontal position overlying said first arm means and tilt the wheel upwardly upon the conveying means to and beyond a stable upright position into engagement with said second arm means and second arm means being operable during movement from its transfer position to its rest position to control continued tilting of said wheel to a horizontal position upon said conveying means; and overload release means operable to disengage said drive means from said one of said arm means in the event either of said arm means encounters an abnormal resistance to movement toward its rest position.

9. The invention defined in claim 8 wherein said motion transmitting means comprises link means interconnecting said first and second arm means to each other.

10. The invention defined in claim 8 wherein said motion transmitting means comprises gear means intermeshed between said first and second arm means.

11. The invention defined in claim 8 wherein said motion transmitting means comprises chain and sprocket means rotatively coupling said first and second arm means to each other.

12. The invention defined in claim 8 wherein said first and second pivot means each comprise a shaft mounted for pivotal movement about a fixed axis and extending beneath said conveying chains, and said first and second arm means each comprise a pair of arms each fixedly secured at one end to said shaft, said arms being located on said shaft in parallel, spaced relationship symmetrically offset from said chains.

* * * * *